J. PURSSELLEY.
NUT LOCK.
APPLICATION FILED OCT. 8, 1914.

1,139,225.

Patented May 11, 1915.

Witnesses
CR Beall.

Inventor
J. Purselley.
By
Attorney

UNITED STATES PATENT OFFICE.

JAMES PURSSELLEY, OF DRUMRIGHT, OKLAHOMA, ASSIGNOR OF ONE-FOURTH TO ROBERT L. YARBRO AND ONE-FOURTH TO WILEY C. JONES, BOTH OF DRUMRIGHT, OKLAHOMA.

NUT-LOCK.

1,139,225.

Specification of Letters Patent. Patented May 11, 1915.

Application filed October 8, 1914. Serial No. 865,674.

*To all whom it may concern:*

Be it known that I, JAMES PURSSELLEY, a citizen of the United States, residing at Drumright, in the county of Creek and State of Oklahoma, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks, and has for its principal object to provide a simple and efficient nut lock which will effectively hold a nut against rotation after the same has been tightened to the desired point.

Another object of the invention is to provide a device which is capable of being secured to a nut constructed in the ordinary way without undue inconvenience to the user.

A further object of the invention is to provide a device which may be easily and cheaply manufactured at a minimum amount of expense.

Figure 1:
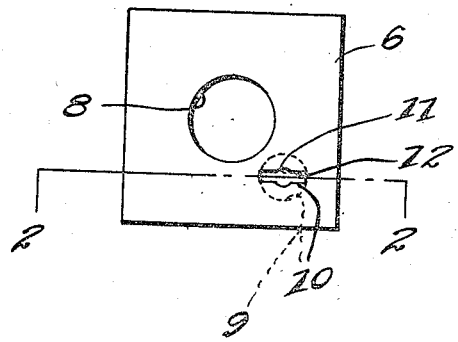
Figure 2:
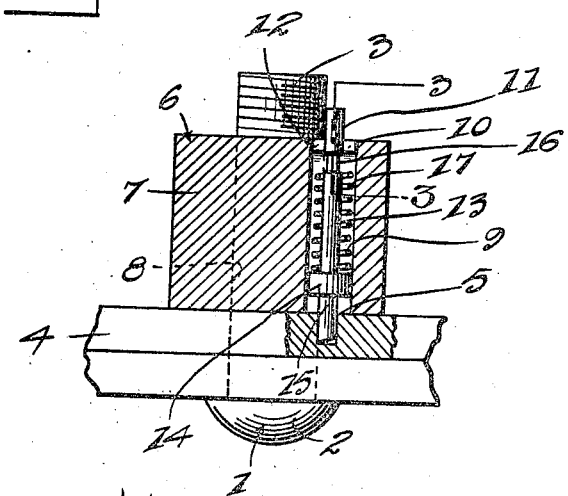
Figure 3:
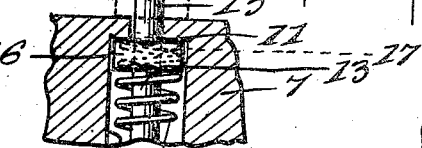

With these and other objects in view, the invention consists in the novel combination and arrangement of parts which will be fully set forth in the following specification and accompanying drawings, in which, Figure 1 is a top plan view of a nut lock constructed in accordance with this invention, Fig. 2 is a sectional view taken on line 2—2 of Fig. 1, and Fig. 3 is an enlarged detail sectional view taken on line 3—3 of Fig. 2.

Referring now to the drawings by characters of reference, the numeral 1 designates as an entirety a bolt of the ordinary construction comprising the head 2 and threaded shank 3. This bolt is extended through a suitable aperture formed in the article to be clamped, which is designated by the numeral 4, and said article is provided with suitable apertures 5, the use of which will appear as the description proceeds.

The nut, which is designated generally by the numeral 6, comprises the body 7 having formed therein the longitudinally extending, central bore 8 which is internally screw threaded and arranged to coöperate with the threads on the stem 3. Intermediate the bore 8 and one corner of the nut is formed the longitudinal bore 9 which is provided with the end closure 10, which end closure is formed with a central aperture 11 and the double keyhole slot 12. Slidable longitudinally through the aperture 9 is the locking stem 13, which stem is provided near its lower terminal with the enlargement 14, which enlargement is of the same diameter as the bore 9, while the stem is of the same diameter as the bore 11. A cylindrical extension 15 is formed at the lower side of the enlargement 14 and this cylindrical extension 15 is arranged to engage in the recesses 5 formed in the article which is being clamped. Extending transversely of the stem 13 near its upper terminal is the cross piece designated by the numeral 16, which cross piece is arranged to slide through the double keyhole slot when the device is in use. Surrounding the stem 13 intermediate the closure 10 and the enlargement 14 is a suitable coil spring 17, which spring is arranged to normally bear against the closure 10 and the enlargement 14 to force the extension 15 into an aperture 5.

From the foregoing it will be apparent that in use the nut is turned to the desired point with the stem 13 raised so that the extension 15 will lie within the aperture 9. In this position the cross piece 16 will lie on the upper surface of the nut and transversely of the keyhole slot, thus retaining the device in its unlocked position. After the nut has been turned to the desired point, the stem 13 is rotated and thus released so that the cross piece passes through the double keyhole slot and under the influence of the coil spring 17, it will be apparent that the extension 15 will be forced into one of the apertures 5. After having passed into the apertures 5, the enlargement 14 will engage the outer side of the element which is being clamped and thus bring the cross piece 16 to a point slightly beneath the end closure 10. This will permit the cross piece to be rotated to a transverse position with relation to the double keyhole slot 12, and thereby further lock the nut in place and prevent any accidental movement thereof.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A nut lock including a body having a central bore extending therethrough, said central bore being screw threaded and arranged to fit the shank of the bolt, the body also having a parallel bore extending partially therethrough, a closure at one end of the bore, said closure being provided with a double keyhole slot, a stem slidable in the parallel bore, said stem being of less diameter than the bore, an enlargement near the lower terminal of the stem, said enlargement being of substantially the same diameter as the bore, and free to slide therein, a transverse bar on the stem near its upper end, said bar being of a size to permit the same to pass through the double keyhole slot, and a coil spring surrounding the stem and arranged to exert downward pressure on the enlargement to force the stem downwardly and into engagement with the article which is being clamped when the device is in use, the transverse bar being arranged to pass through the keyhole slot and engage the under side of the end closure to hold the same against accidental displacement.

In testimony whereof I affix my signature in presence of two witnesses.

JAMES PURSSELLEY.

Witnesses:
MIKE CURRANT,
TOM POPE.